(12) United States Patent
Tiemann

(10) Patent No.: US 6,941,758 B2
(45) Date of Patent: Sep. 13, 2005

(54) INTERNALLY COOLABLE SCREW

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 10/640,268

(22) Filed: Aug. 14, 2003

(65) Prior Publication Data

US 2004/0093872 A1 May 20, 2004

(30) Foreign Application Priority Data

Aug. 16, 2002 (EP) .......................... 02018492

(51) Int. Cl.[7] ................................ F02C 7/20
(52) U.S. Cl. ................ 60/752; 60/798; 411/395
(58) Field of Search .................. 411/395; 60/798, 60/752

(56) References Cited

U.S. PATENT DOCUMENTS

| | | | |
|---|---|---|---|
| 126,366 A | * | 4/1872 | Wills .................... 411/387.4 |
| 3,408,812 A | | 11/1968 | Stenger |
| 3,943,703 A | | 3/1976 | Kronogard |
| 4,820,097 A | * | 4/1989 | Maeda et al. ............ 165/168 |
| 6,047,552 A | | 4/2000 | Gross et al. |
| 6,588,999 B2 | * | 7/2003 | Kubler et al. .......... 411/82.1 |
| 6,604,899 B2 | * | 8/2003 | Kubler et al. ............. 411/82 |
| 6,718,774 B2 | * | 4/2004 | Razzell .................... 60/798 |

FOREIGN PATENT DOCUMENTS

EP                0021161             1/1981

* cited by examiner

Primary Examiner—Ehud Gartenberg
(74) Attorney, Agent, or Firm—Harness, Dickey & Pierce, P.L.C.

(57) ABSTRACT

A screw includes a head and a shank, and includes a coolant passage which has an inflow opening and an outflow opening. The cooling pasage does not pass axially through the entire head and shank. By avoiding a coolant flow which passes axially through the entire screw, especially effective utilization of a coolant is achieved, in particular by coolant which also flows on the outer surface of the screw.

29 Claims, 3 Drawing Sheets

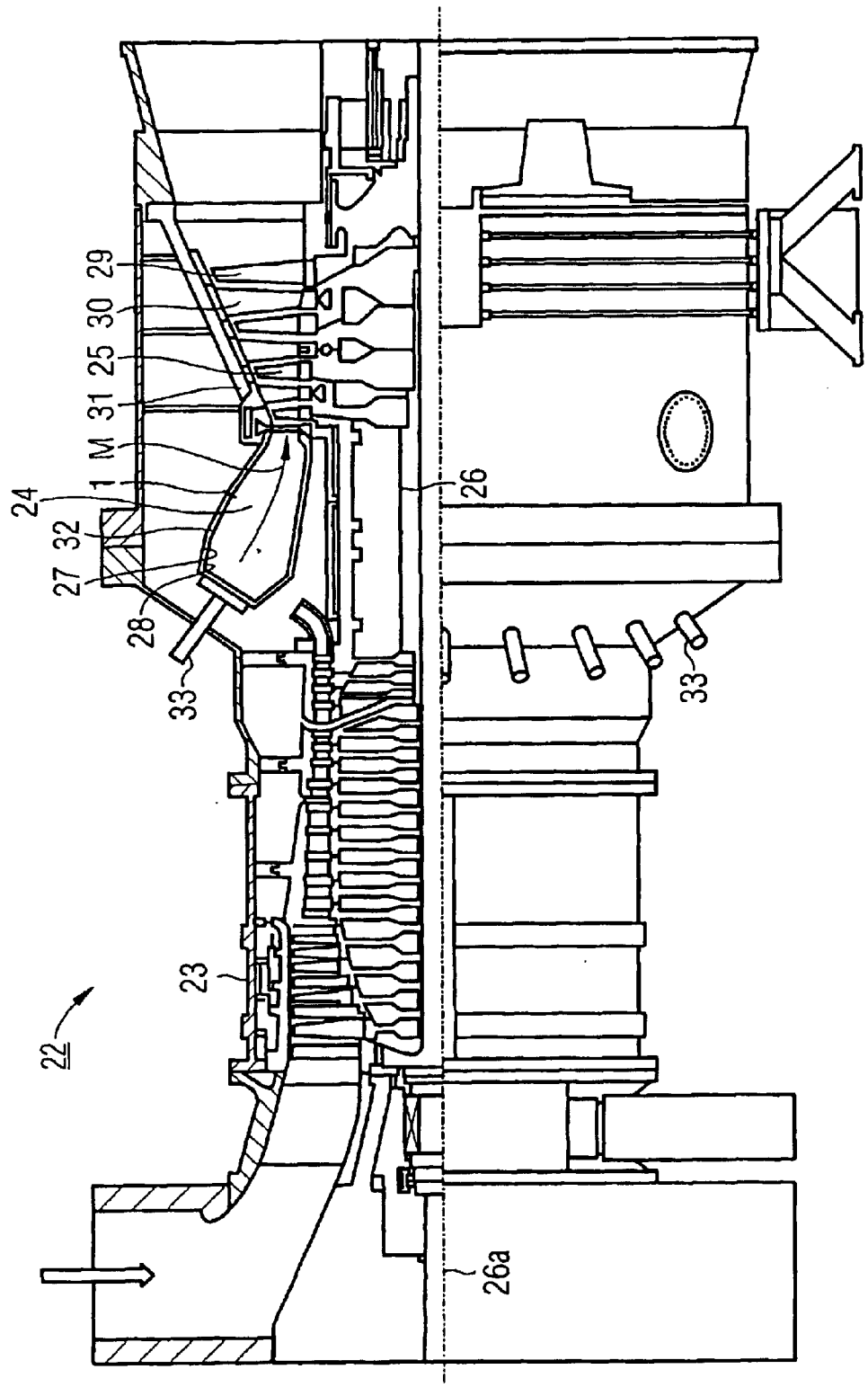

INTERNALLY COOLABLE SCREW

The present application hereby claims priority under 35 U.S.C. §119 on European patent application number EP 02018492.5 filed Aug. 16, 2002, the entire contents of which are hereby incorporated herein by reference.

FIELD OF THE INVENTION

The invention generally relates to a screw which can be internally cooled by a flowing coolant.

BACKGROUND OF THE INVENTION

Screws subjected to high mechanical and thermal loads are used, for example, in gas turbine construction. An example of application is the fastening of a combustion-chamber inner lining to a wall of a combustion chamber.

It is normally attempted to operate a gas turbine with as high a temperature as possible in the combustion chamber in order to achieve a high efficiency. Gas temperatures of 1200° C. to 1300° C. are typically achieved at the outlet of the combustion chamber. The combustion-chamber inner lining is often fastened to the combustion-chamber wall with screws inserted from the inside, i.e. from the combustion chamber. The head of the screws is therefore directly exposed to the fuel gas in the combustion chamber. If the screw or a part of the screw, in particular the screw head, due to a failure of said screw, gets into the combustion chamber and is entrained by the gas flow, serious damage to the downstream turbine is the result.

In order to reliably prevent failure of the fastening screws arranged in the combustion chamber, the screws can be designed to be coolable. To this end, the fastening screw has, for example, an axial bore through which a cooling fluid, in particular cooling air, is directed into the combustion chamber from the outside of the latter. The cooling fluid mixes with the fuel gases in the combustion chamber. As a result, the temperature in the combustion chamber is undesirably reduced. The loss of efficiency associated therewith is tolerated in order to ensure sufficient strength of the fastening screws by means of the cooling. However, ensuring sufficient mechanical loading capacity of the fastening screws means a considerable coolant requirement.

SUMMARY OF THE INVENTION

An object of an embodiment of the invention is to specify a screw which can be internally cooled by a flowing coolant. A further object of an embodiment of the invention is to specify a screw which has an especially low coolant requirement.

An object may be achieved by a screw having a head, a shank, and a coolant passage having an inflow opening and an outflow opening. The coolant passage does not pass axially through the entire head. The screw has "closed cooling".

It is out of the question for a coolant inlet or outlet to be arranged in each case on both end faces of the screw, i.e. both on the end face of the shank and on the top surface of the head. At least one coolant inlet or outlet is arranged laterally, i.e. between the top surface of the head and the end face of the shank. In particular in cases in which an exclusively axial coolant inlet or outlet is not possible or is not desirable from the processing point of view, a coolant flow directed radially toward the longitudinal axis of the screw can therefore be produced—in the case of a lateral coolant inlet. Due to this radial coolant flow, the screw is cooled from outside by the same coolant which cools it from inside. This makes possible especially effective use of coolant, i.e. very effective utilization of the heat capacity of the coolant, and thus especially economical use of coolant. The temperature difference between the coolant and the screw to be cooled is utilized to an especially high degree.

According to a preferred configuration, the coolant outlet is arranged laterally on the screw in such a way that the coolant flowing out of the screw flows in the axial direction along the shank. In this way, in addition to the inner cooling of the screw, especially effective cooling of the outer surface of the screw is also ensured. In order to cool the shank over its entire length not only from inside but also from outside, the coolant outlet opening is advantageously arranged as far as possible directly next to the head or on the head itself or in the transition region between head and shank. The coolant flows out of the coolant outlet opening axially in the direction of the end face of the shank. On the other hand, the coolant inlet opening is preferably located on the end face of the shank, i.e. on the shank end. The coolant inflow direction is thus opposed to the coolant outflow direction.

In order to cool the entire circumference of the shank as uniformly as possible from outside, a plurality of outlet openings, preferably distributed at least approximately in a rotationally symmetrical manner about the axis of the screw, are preferably arranged on the shank circumference and/or on the head. In addition, the uniformly distributed outlet openings have the advantage that asymmetrical weakening of the cross section of the shank and thus an unnecessary reduction in the mechanical loading capacity are avoided. The coolant outlet opening or openings is/are preferably arranged in a screw collar defining the shank toward the head as a thickened region of the shank. By the arrangement of the coolant outlet openings in the screw collar, weakening of the cross section of the shank on account of the coolant outlet openings is avoided. Furthermore, the screw collar can serve to deflect the direction of flow of the coolant.

According to a preferred configuration, the head of the screw is internally cooled, the direction of flow of the coolant preferably being deflected in the head, i.e. the latter has a "deflecting region". A coolant inlet or outlet opening is preferably not provided on the top surface or end face of the head. In this way, processes, for example chemical reactions, which take place in the space bordering the end face of the head are not affected by coolant or other fluid flowing into or out of this space. On the other hand, the coolant flowing out of the screw laterally in the region of the shank, the head and/or the screw collar is advantageously passed on in a specific manner and/or is advantageously conducted in a closed coolant circuit. In this case, a coolant inlet opening arranged axially in the shank end is especially suitable for a specific cooling feed or return. The coolant can in this case flow into the coolant passage, which to begin with runs axially in the shank, without deflection and thus virtually without pressure loss. Furthermore, a feed line can be connected, for example screwed, in a simple manner to the coolant inlet opening arranged on the shank end.

Specific cooling of the head is especially important for the safety of the screwed connection during high thermal stressing. In this case, the entire head should be cooled as uniformly as possible. This is preferably achieved by the fact that the coolant flowing through the shank into the screw flows in a straight line at least up to the screw collar, in particular up to the head, and is not deflected until in the head, the coolant being split up in the deflecting region into a plurality of coolant partial flows. In this case, the individual sectional passages are distributed at least approximately uniformly, in particular in a rotationally symmetrical manner, in the head of the screw, also in the screw collar if need be.

The closed internally cooled screw is especially suitable for fastening a combustion-chamber inner lining to a combustion-chamber wall of a gas turbine.

The advantages of an embodiment of the invention lie in particular in the fact that, by avoiding a coolant flow which passes axially through the entire screw, firstly especially effective utilization of the coolant can be achieved, in particular by coolant which also flows on the outer surface of the screw. Secondly, this avoids an undesirable inflow and/or outflow of coolant into or out of the screw, as a result of which an unintentional direct effect of coolant on a space arranged axially to the screw is ruled out.

BRIEF DESCRIPTION OF THE DRAWINGS

An exemplary embodiment of the invention is explained in more detail below with reference to the drawings, in which:

FIG. 3 shows a gas turbine with a gas-turbine combustion chamber having a screw according to FIGS. 1 and 2.

Parts corresponding to one another are provided with the same designations in all the figures.

DETAILED DESCRIPTION OF THE PREFERRED EMBODIMENTS

Figure 1A:
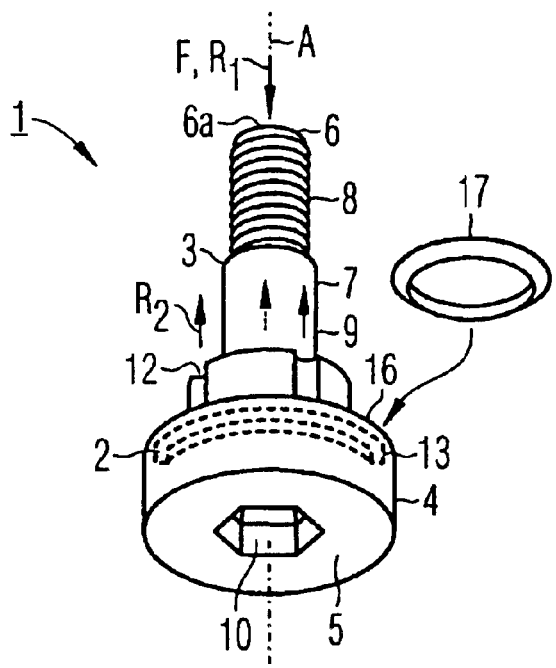
FIGS. 1a, b show an internally coolable screw and a cutaway detail of a coolant passage of the internally coolable screw.
Figure 1B:
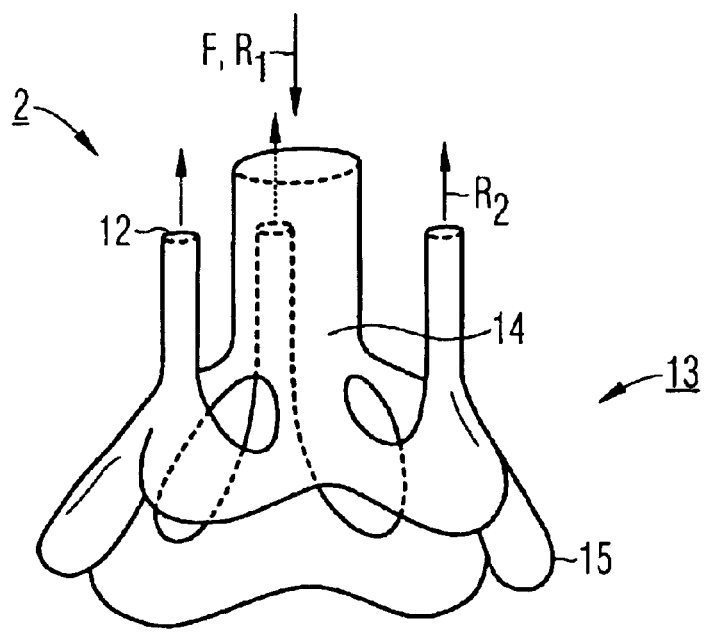

FIG. 1a shows an internally coolable screw 1, the coolant passage or cooling passage 2 of which is shown as a cutaway detail in FIG. 1b. The screw 1 has a shank 3 and a head 4 and extends along an axis or axis of symmetry A from a top surface 5, lying at the bottom in the representation, of the head 4 up to a shank end 6. The shank 3, with a shank circumference 7, has a thread 8 and a screw collar 9 of thickened design defining the shank 3 toward the head 4. On its top surface 5, the head 4 has a hexagonal actuating opening 10 for a hexagon socket key.

A coolant or cooling fluid F flows axially at the shank end 6 in inflow direction R1 into an inflow opening 6a of the screw 1 and discharges from the latter at three coolant-outflow openings or outflow openings 12 in outflow direction R2, which is opposed to the inflow direction R1. The cooling passage 2 runs first of all coaxially in the shank 3 and, in the head 4, assumes the course indicated by broken lines in FIG. 1a and shown in detail in FIG. 1b. The cooling passage 2 widens close above the actuating opening 10, as a result of which an impingement-cooling effect is produced in this region. The region of the cooling passage 2 in the head 4 is referred to as deflecting region 13.

After it has widened, the cooling passage 2 splits into three curved sectional passages 14. The sectional passages or branches 14 have a uniform cross section and run inside the head 4 as far as close to the top surface 5. There, the sectional passages 14 branch in a smoothly blended manner into twice the number of fine passages 15. The six fine passages 15 run close to the surface of the head 4 before they are blended smoothly inward, i.e. in the direction of the axis A, and two fine passages 15 each are combined to form one sectional passage 14.

Via the three sectional passages 14 thus combined in the vicinity of the shank 3, the coolant F discharges from the screw 1 through the outflow openings 12 arranged in a rotationally symmetrical manner in the screw collar 9. The head 4 of the screw 1 is thus cooled intensively without coolant F flowing out in the direction of the top surface 5. A sealing ring 17 can be put onto the inside 16 of the head 4. The outflow openings 12 are open radially outward, i.e. toward the sealing ring 17 put onto the screw collar 9.

The screw 1 is made of a cast material. The shape of the cooling passage 2 is selected in such a way that the screw 1, including the entire cooling passage 2, can be produced by a casting process. Further processing steps, in particular machining steps, such as drilling, are not necessary for producing the cooling passage 2, including the sectional passages 14 and the fine passages 15. The casting process works without the use of "lost inserts". To this end, the screw 1 with the cooling passage 2 is formed in such a way that, with an undercut being avoided, the casting process can be carried out using a plurality of mask elements. In this case, provision is made for a first mask element to be positioned in a casting mold, in which first mask element a second mask element is guided like a slide in a displaceable manner. After the casting, the mask elements can easily be removed and can therefore be reused.

Figure 2:
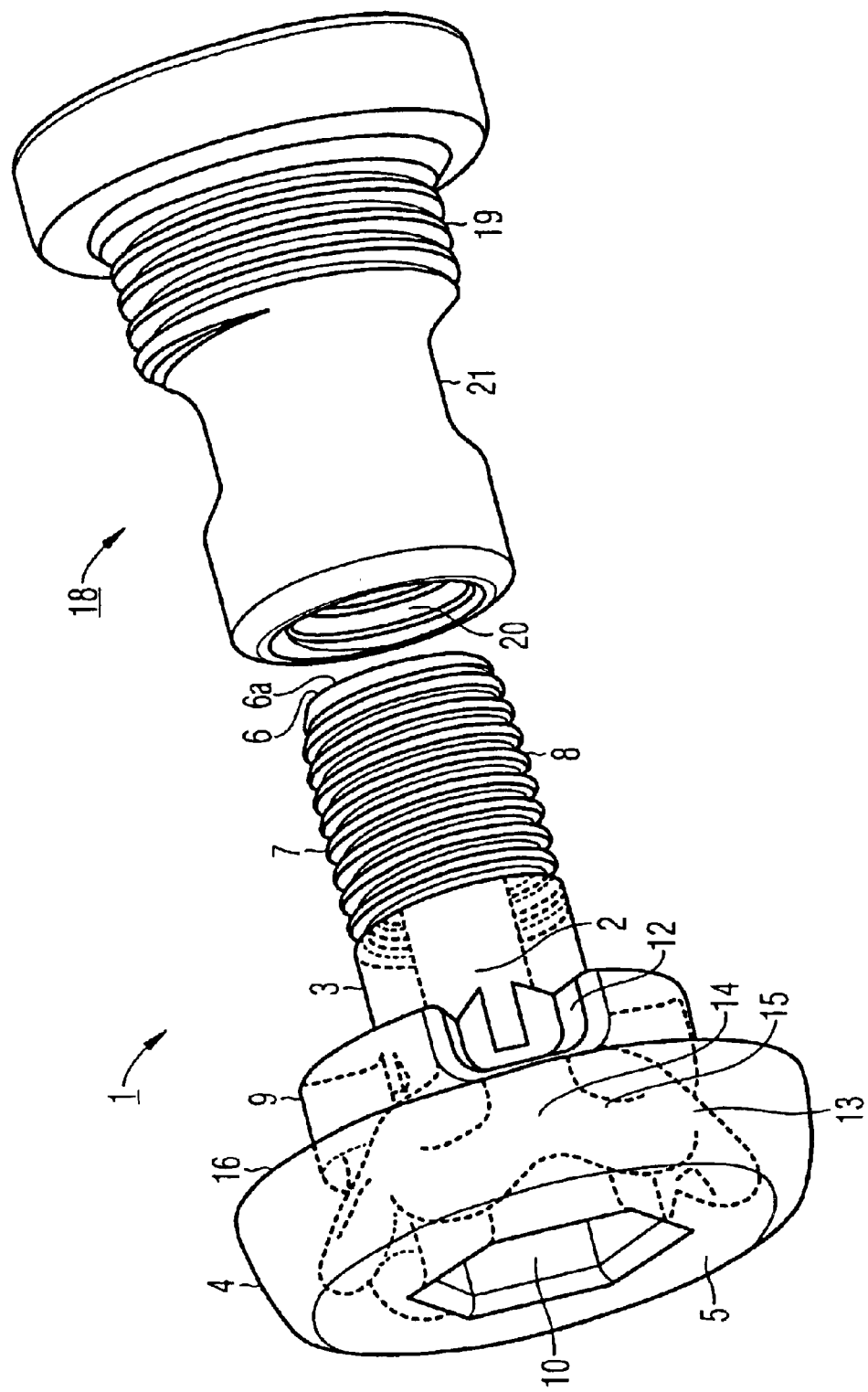
FIG. 2 shows the internally coolable screw according to FIG. 1 with an associated bush.

As FIG. 2 shows, the screw 1 can be screwed together with a bush 18. The bush 18 has an external thread 19 designed as a left-hand thread and also an internal thread 20, which, in the same way as the thread 8 of the screw 1, is designed as a right-hand thread and into which the screw 1 can be screwed. The bush 18 is screwed from outside into a wall (not shown here) of a combustion chamber of a gas turbine. A combustion-chamber inner lining is fastened with the screw 1 to the wall of the combustion chamber. Due to the design of the external thread 19 of the bush 18 as a left-hand thread and the design of the internal thread 20 of the bush 18 and of the corresponding thread 8 of the screw 1 as a right-hand thread, the screw 1 is counterscrewed together with the bush 18. As a safety feature to prevent loosening, the internal thread 20 has an oval cross-sectional region 21. The screw 1 is secured by clamping the thread 8 in the oval cross-sectional region 21 without further securing elements.

Enclosed between the combustion-chamber wall, into which the bush 18 is screwed, and the combustion-chamber inner lining, which is held by the screw 1, is a space in which cooling air F flows, which is then used as preheated combustion air. The coolant F flowing out of the screw 1 flows into this space. This coolant F, which has already been heated in the screw 1, thus contributes to the increase in the temperature of the combustion air to be fed to the gas turbine and thus to the increase in efficiency. In contrast, in the case of open cooling of the screw 1, i.e. in the case of a complete axial flow of the coolant F through the entire screw 1, the coolant F would pass directly into the combustion chamber, reduce the temperature there and thus reduce the efficiency.

The closed internally cooled screw 1 therefore contributes to the especially effective utilization of the coolant F and at the same time, by increasing the combustion-air temperature, helps to achieve a high efficiency of the gas turbine.

A gas turbine 22 is schematically shown in cross section in FIG. 3. The gas turbine 22 has a compressor 23 for combustion air, a gas-turbine combustion chamber or combustion chamber 24, and a turbine 25 for driving the compressor 23 and a generator (not shown) or driven machine. To this end, the turbine 25 and the compressor 23 are arranged on a common turbine shaft 26, which is also referred to as turbine rotor and to which the generator or the driven machine is also connected, and which is rotatably mounted about its center axis 26a.

The combustion chamber 24 is fitted with a number of burners 33 for burning a liquid or gaseous fuel. A combustion-chamber wall 27 is lined with a combustion-chamber inner lining 28.

The turbine 25 has a number of rotatable moving blades 29 connected to the turbine shaft 26. The moving blades 29 are arranged in a ring shape on the turbine shaft 26 and thus form a number of moving blade rows. Furthermore, the turbine 25 comprises a number of fixed guide blades 30, which are likewise fastened in a ring shape to an internal casing 31 of the turbine 25 while forming guide blade rows. The moving blades 29 thus serve to drive the turbine shaft 26 by impulse transmission of the working medium M flowing through the turbine 25. The guide blades 30, on the other hand, serve to guide the flow of the working medium M between in each case two moving blade rows or moving blade rings following one another as viewed in the direction of flow of the working medium M. In this case, a successive pair consisting of a ring of guide blades 30 or a guide blade row and of a ring of moving blades 29 or a moving blade row is referred to as a turbine stage.

In order to make possible a high efficiency of the gas turbine 22, the gas turbine 22 is operated at a high temperature of the working medium M. The working medium M discharges from the combustion chamber 24 at a temperature of about 1200 to 1300° C. The compressed combustion air fed for the combustion is preheated in a shell space 22, which is formed between the inner wall 27 of the combustion chamber 24 and the combustion-chamber inner lining 28, before entry to the burner 33. As a result, the inner wall 27 of the combustion chamber 24 is cooled at the same time. The screw 1, which holds the combustion-chamber inner lining 28 on the inner wall 27 of the combustion chamber 24, is subjected to high mechanical and thermal loads under these operating conditions. The head 4 of the screw 1 projects into the combustion chamber 24. The highly efficient cooling of the screw 1, in particular of the head 4, provides for a high strength of the screw 1 with sufficient safety reserves under all operating conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A screw, comprising:
   a head;
   a shank; and
   a coolant passage, including an inflow opening and an outflow opening,
   wherein the coolant passage does not pass axially through the entire head, and
   wherein the outflow opening is arranged to direct a coolant flow in an axial direction along the exterior of the shank.

2. The screw as claimed in claim 1, wherein the outflow opening is arranged on the shank circumference.

3. The screw as claimed in claim 1, wherein the inflow opening is arranged on the shank end.

4. The screw as claimed in claim 1, wherein the outflow opening is arranged on the head.

5. The screw as claimed in claim 3, wherein a plurality of outflow openings are arranged at least approximately in a rotationally symmetrical manner about the axis of the shank.

6. The screw as claimed in claim 1, wherein the coolant inflow direction is opposed to the coolant outflow direction.

7. The screw as claimed in claim 1, further comprising:
   a screw collar, defining the shank in the direction of the head.

8. The screw as claimed in claim 7, wherein the outflow opening is arranged on the screw collar.

9. The screw as claimed in claim 1, further comprising:
   a deflecting region, arranged in the head, of the coolant passage.

10. The screw as claimed in claim 9, wherein the coolant passage splits up in the deflecting region.

11. A gas-turbine combustion chamber, comprising:
    a combustion-chamber inner lining;
    a combustion-chamber wall; and
    a screw as claimed in claim 1, wherein the screw fastens the combustion-chamber inner lining and combustion-chamber wall.

12. The gas-turbine combustion chamber as claimed in claim 11, wherein the outflow opening of the screw is arranged in a shell space between the combustion-chamber inner lining and the combustion-chamber wall.

13. The screw as claimed in claim 2, wherein the inflow opening is arranged on the shank end.

14. The screw as claimed in claim 2, wherein the outflow opening is arranged on the head.

15. The screw as claimed in claim 4, wherein a plurality of outflow openings are arranged at least approximately in a rotationally symmetrical manner about the axis of the shank.

16. The screw as claimed in claim 2, wherein the coolant inflow direction is opposed to the coolant outflow direction.

17. The screw as claimed in claim 3, further comprising:
    a screw collar, defining the shank in the direction of the head.

18. The screw as claimed in claim 2, further comprising:
    a deflecting region, arranged in the head, of the coolant passage.

19. The screw as claimed in claim 18, wherein the coolant passage splits up in the deflecting region.

20. A gas-turbine combustion chamber, comprising:
    a combustion-chamber inner lining;
    a combustion-chamber wall; and
    a screw as claimed in claim 6, wherein the screw fastens the combustion-chamber inner lining and combustion-chamber wall.

21. The gas-turbine combustion chamber as claimed in claim 20, wherein the outflow opening of the screw is arranged in a shell space between the combustion-chamber inner lining and the combustion-chamber wall.

22. A screw, comprising:
    a head;
    a shank; and
    a coolant passage, including an inflow opening and an outflow opening,
    wherein the coolant passage passes axially through only a portion of the head, and
    wherein the outflow opening is arranged to direct a coolant flow in an axial direction along the exterior of the shank.

23. The screw as claimed in claim 22, wherein the outflow opening is arranged on the shank circumference.

24. The screw as claimed in claim 22, wherein the inflow opening is arranged on the shank end.

25. The screw as claimed in claim 22, wherein the outflow opening is arranged on the head.

26. The screw as claimed in claim 22, wherein a plurality of outflow openings are arranged at least approximately in a rotationally symmetrical manner about the axis of the shank.

27. A gas-turbine combustion chamber, comprising:

a combustion-chamber inner lining;

a combustion-chamber wall; and a screw, the screw including a head, a shank, and a coolant passage, including an inflow opening and an outflow opening, wherein the coolant passage passes axially through only a portion of the head, wherein the screw fastens the combustion-chamber inner lining and combustion-chamber wall, and wherein the outflow opening is arranged to direct a coolant flow in an axial direction along the exterior of the shank.

28. A gas-turbine combustion chamber, comprising:

a combustion-chamber inner lining;

a combustion-chamber wall; and a screw, the screw including a head, a shank, and a coolant passage, including an inflow opening and an outflow opening, wherein the coolant passage does not pass axially through the entire head, wherein the screw fastens the combustion-chamber inner lining and combustion-chamber wall, and wherein the outflow opening is arranged to direct a coolant flow in an axial direction along the exterior of the shank.

29. The gas-turbine combustion chamber as claimed in claim 28, wherein the outflow opening of the screw is arranged in a shell space between the combustion-chamber inner lining and the combustion-chamber wall.

\* \* \* \* \*